United States Patent
Elfström et al.

(10) Patent No.: US 10,659,174 B2
(45) Date of Patent: *May 19, 2020

(54) METHOD AND DEVICE FOR ENABLING TESTING OF A COMMUNICATION NODE

(71) Applicant: TELEFONAKTIEBOLAGET LM ERICSSON (PUBL), Stockholm (SE)

(72) Inventors: Torbjörn Elfström, Fjärås (SE); Ove Nilsson, Ulricehamn (SE); Lars Persson, Åsa (SE); Moritz Saarman, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,584

(22) Filed: Jul. 17, 2019

(65) Prior Publication Data

US 2019/0342015 A1 Nov. 7, 2019

Related U.S. Application Data

(63) Continuation of application No. 15/535,292, filed as application No. PCT/EP2016/066404 on Jul. 11, 2016, now Pat. No. 10,389,455.

(51) Int. Cl.
*H04B 17/00* (2015.01)
*H04B 17/10* (2015.01)

(52) U.S. Cl.
CPC ....... *H04B 17/101* (2015.01); *H04B 17/0087* (2013.01)

(58) Field of Classification Search
CPC ................ H04B 17/00; H04B 17/0017; H04B 17/0025; H04B 17/003; H04W 24/00
See application file for complete search history.

(56) References Cited

U.S. PATENT DOCUMENTS

| | | |
|---|---|---|
| 5,978,659 A | 11/1999 | Kim |
| 10,389,455 B2* | 8/2019 | Elfstrom |

(Continued)

FOREIGN PATENT DOCUMENTS

RU   2 124 269 C1   12/1998

OTHER PUBLICATIONS

International Search Report with Written Opinion issued in Application No. PCT/EP2016/066404 dated Mar. 17, 2017, 14 pages.

(Continued)

*Primary Examiner* — Tuan Pham
(74) *Attorney, Agent, or Firm* — Rothwell, Figg, Ernst & Manbeck, P.C.

(57) ABSTRACT

The embodiments herein relate to a method performed by a testing device for enabling testing of a communication node. The testing device measures a test parameter associated with RF characteristics of the communication node when it is located at a test location during a first condition. The communication node is configured with a node setting during the measurement in the first condition. The testing device measures the test parameter associated with the RF characteristics of the communication node when it is located at the test location during a second condition. The communication node is configured with the same node setting in the second condition as in the first condition. The testing device checks whether a result parameter associated with the test parameter measured during the first and second condition fulfills a requirement.

24 Claims, 8 Drawing Sheets

(56) References Cited

U.S. PATENT DOCUMENTS

| | | | |
|---|---|---|---|
| 2004/0257092 A1* | 12/2004 | Verspecht | G01R 27/28 |
| | | | 324/638 |
| 2008/0056340 A1 | 3/2008 | Foegelle | |
| 2013/0288610 A1* | 10/2013 | Toh | H03G 3/3042 |
| | | | 455/67.14 |
| 2014/0004887 A1 | 1/2014 | Farmer et al. | |
| 2014/0273873 A1* | 9/2014 | Huynh | H04B 17/29 |
| | | | 455/67.12 |

OTHER PUBLICATIONS

3rd Generation Partnership Project; Technical Specification Group Radio Access Network; E-UTRA and UTRA; Radio Frequency (RF) requirement background for Active Antenna System (AAS) Base Station (BS) (Release 13), 3GPP Draft; 3GPP TR 37.842 (V1.11.0); R4-164279; XP051107136; May 22, 2016, 87pages.

Sumitomo Electric, NTT Docomo, NEC: "TP for TR 37.842:Indoor Anechoic Chamber EIRP testing procedure", R4-164724; 3GPP TSG-RAN WG4 Meeting #79, Nanjing, China, May 23-27, 2016, 8 pages.

Russian Search Report with English Translation, issued in corresponding Russian Application No. 2019103578, dated Apr. 15, 2019, 4 pages.

Russian Office Action with English Translation, issued in corresponding Russian Application No. 2019103578, dated Apr. 17, 2019, 8 pages.

\* cited by examiner

METHOD AND DEVICE FOR ENABLING TESTING OF A COMMUNICATION NODE

CROSS-REFERENCE TO RELATED APPLICATIONS

This application is a continuation of U.S. application Ser. No. 15/535,292, having a section 371(c) date of Jun. 12, 2017 (status pending), which is the US national stage of International patent application no. PCT/EP2016/066404, filed Jul. 11, 2016. The above identified applications are incorporated by this reference.

TECHNICAL FIELD

Embodiments herein relate generally to a testing device and a method performed by a testing device. More particularly the embodiments herein relate to enabling testing of a communication node.

BACKGROUND

Active Antenna Systems (AAS) is an important part of the evolution of the Long Term Evolution (LTE) and an essential part of the Fifth Generation (5G) mobile communication. AAS is a generic term that is often used to describe radio base stations that incorporate a large number of separate transmitters and antenna elements that can be used for Multiple Input Multiple Output (MIMO) and beamforming as an integrated product. MIMO enables multiplying of the capacity of a radio link by using multiple input antennas and multiple output antennas. Beamforming can be described as a signal processing technique used for controlling the directionality of transmission and reception of radio signals. 3GPP defines an AAS base station as a "BS system which combines an Antenna Array with an Active Transceiver Unit Array and a Radio Distribution Network" (3GPP TS 37.105 V13.0.0 (2016 March), Release 13). According to the 3GPP, an AAS has a radiation pattern which may be dynamically adjustable. In a "normal" base station, i.e. a base station which is a non-AAS base station, the radio equipment and the antenna are separated. In addition, a normal base station does not have capability of advanced antenna features such as an AAS base station.

AAS will be one of the key aspects of 5G as the industry moves higher up in frequency and more complex array antenna geometries are needed to achieve the desired link budget. At higher frequencies (e.g. 15 GHz, 28 GHz or higher), propagation losses are much greater than in currently used frequency bands (e.g. around 1-2 GHz). Furthermore, it is envisaged that base station transmissions will take place within higher bands in the microwave and millimeter-wave region. Since the transmit power of both base stations and user equipment is limited by physical constraints and considerations such as Electro-Magnetic Fields (EMF) for base stations and Specific Absorption Rate (SAR) for user equipment, it is not possible to compensate the increased penetration losses and provide sufficient Signal-to-Interference+Noise Ratio (SINR) within wider bandwidths (wider than the normal bandwidths which are around e.g. 1-20 MHz) simply with increased transmit power. In order to achieve the link budgets required for high data rates (e.g. 1 Gbit/s), beamforming will be necessary. It is therefore expected that integrated active arrays will become a mainstream base station building practice in the 5G era.

It is envisaged that New Radio (NR) and 5G will operate in higher frequency bands than today. For example, 4 Giga Hertz (GHz) is discussed for first systems in Japan, whilst the World Radio Communication Conference 2019 (WRC19) may allocate spectrum up to 6 GHz. Further into the future, it is envisaged that the International Telecommunication Union (ITU) and/or regional regulators may allocate microwave and millimeter wave spectrum in the range 10-100 GHz.

Antennas, base stations, AAS etc. may be tested to ensure that they meet specifications or simply to characterize it. Parameters that may be measured during testing may be for example transmit power, radiated unwanted emission, antenna gain, radiation pattern, beam width, polarization, impedance etc. A test may be performed in different ranges, such as far-field range, near-field range, free-space range, etc.

In a far-field test range, the testing device (also referred to as Antenna Under Test (AUT)) is placed in far field of a probe antenna (the probe antenna is an antenna which can transmit or receive power to/from the testing device, and which has a known radiation pattern and characteristics). In a far-field, the testing device's radiation pattern does not change shape with the distance between the testing device and the probe antenna.

In a near-space range, the testing device and the probe antenna are located close to each other.

A free-space range is a measurement location designed to simulate measurements that would be performed in space, i.e. where reflected waves from nearby objects and the ground are suppressed as much as possible. An anechoic chamber is an example of a free space range measurement location.

CATR is a facility that may be used to provide testing of antenna systems at frequencies where obtaining far-field spacing to the testing device may be difficult using traditional free space testing methods. In a CATR facility, a reflector is used to reflect the waves.

Antenna Reference Point (ARP) is a point located somewhere in the interface between the radio and the antenna of a base station. ARP is used as a reference in measurements and testing, and various parameters may be measured relative to the ARP. In AAS base station products, the access to the ARP will be limited or it will not be available. Hence, there will be no possibility to carry out conducted measurements found in conformance test requirements included in traditional specifications (e.g. TS 25.141, TS 36.141, TS 37.141 and TS 37.145-1). Also, all Radio Frequency (RF) testing at Research & Development (R&D) level is today done conducted at the ARP. For high frequencies, Over The Air (OTA) testing may be the only way of verifying RF characteristics, such as radiated transmit power (TS 37.145-2) and radiated unwanted emission (to be included in specifications).

OTA, which is an abbreviation for Over The Air, is a technology for transmitting radio signals over the air, as distinct from cable or wire transmission. Over The Air, is an interface that will be used to specify and verify highly integrated products where there possibly will be no ARP available and where the relevant performance need to be defined OTA, as opposed to for traditional radio base stations where performance is specified and verified in a conducted interface like ARP.

In the Third Generation Partnership Project (3GPP) Release-13 version of TS 37.145, a limited number of OTA requirements have been introduced (radiated transmit power and OTA sensitivity). There is an ambition to develop a specification in 3GPP with all RF characteristics defined in the radiated domain. This means that RF parameters needs to be tested in normal environmental conditions and some requirements are defined in extreme environmental conditions. Specific parameters, such as radiated transmit power, radiated unwanted emission, OTA sensitivity and frequency stability that today are measured using cable, will have to be measured OTA. When conducting OTA testing, absolute radiated power will correspond to Equivalent Isotropic Radiated Power (EIRP) and absolute received power will correspond to Equivalent Isotropic Sensitivity (EIS). Assuming a "black-box" approach without any knowledge about the test object implementation these two parameters will be verified in some sort of far field antenna test range, with validated measurement uncertainty assessment in normal condition environment Also, there are regulatory requirements and/or specific customer requirements asking for that radiated transmit power, carrier frequency stability etc. should be verified OTA in extreme operating conditions. For example a normal operating condition has room temperature and no vibrations, and an extreme operating condition may have high or low temperature and substantial vibrations. The conditions applicable for normal operating condition and extreme operating conditions are defined by 3GPP, and will be described later.

Based on R&D quality assurance and customer requirement, the scope of extreme conditions could extend to also include vibration testing of RF characteristics. For receiver sensitivity there is no regulatory requirement to measure during extreme conditions, but it can be expected that customers will request such information.

The challenge with measuring absolute EIRP and absolute EIS OTA under extreme conditions is that EIRP and EIS are defined in the far-field region. The distance to the far-field region is determined of the physical size of the test object antenna aperture and the operating frequency. It is common that the far-field distance becomes very large, requiring large antenna test facilities. Also, relevant for all types of antenna test ranges is that they consist of high-precision mechanical equipment (such as positioners, reflectors, reference antennas, test range antennas) that are not designed for operation in large temperature ranges. Also, if the equipment could operate in extreme temperature condition, the amount of energy needed to cycle the test range would be enormous. Neither can it be made to vibrate according to what is required according to the environmental requirements.

To establish specifications with all RF requirements defined in the radiated domain, would put an impossible task on OTA test facility vendors to handle extreme conditions requirements.

SUMMARY

An objective of embodiments herein is therefore to obviate at least one of the above disadvantages and to provide improved testing of a communication device.

According to a first aspect, the object is achieved by a method performed by a testing device for enabling testing of a communication node. The testing device measures a test parameter associated with RF characteristics of the communication node when it is located at a test location during a first condition. The communication node is configured with a node setting during the measurement in the first condition. The testing device measures the test parameter associated with the RF characteristics of the communication node when it is located at the test location during a second condition. The communication node is configured with the same node setting in the second condition as in the first condition. The testing device checks whether a result parameter associated with the test parameter measured during the first and second condition fulfills the requirement.

According to a second aspect, the object is achieved by a testing device for enabling testing of a communication node. The testing device is configured to measure a test parameter associated with RF characteristics of the communication node when it is located at a test location during a first condition. The communication node is configured with a node setting during the measurement in the first condition. The testing device is further configured to measure the test parameter associated with the RF characteristics of the communication node when it is located at the test location during a second condition. The communication node is configured with the same node setting in the second condition as in the first condition. The testing device is configured to check whether a result parameter associated with the test parameter measured during the first and second condition fulfills the requirement.

Since the test parameters are measured in the test location during a first and second condition, there is no need for access to e.g. any ARP, and testing of a communication device is improved.

Embodiments herein afford many advantages, of which a non-exhaustive list of examples follows:

The embodiments herein make it possible to perform OTA testing for extreme condition of RF characteristics, such as radiated transmit power, OTA sensitivity and radiated unwanted emission. Instead of using large far-field test facilities in extreme condition, the embodiments herein use a small test box, where the couples signal is measure relative to a known signal measure in normal condition (room temperature and no vibrations).

The embodiments herein use the fact that absolute values does not have to be measured during extreme conditions to verify EIRP, EIS and frequency stability under extreme conditions. Instead a differential measurement approach is used for EIRP and EIS. For example, for EIRP and EIS, the impact of extreme conditions on the test object is measured. The difference may be added to an absolute measurement that has been done in a far field test range or a CATR. Note that frequency stability is measured in absolute figures, both in normal and extreme conditions.

To minimize the risk for errors, the communication node may carry a memory where reference data is stored. The reference data may be used to extract RF characteristics in an extreme condition. The data is a composite set of measurement results and associated configuration parameters.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
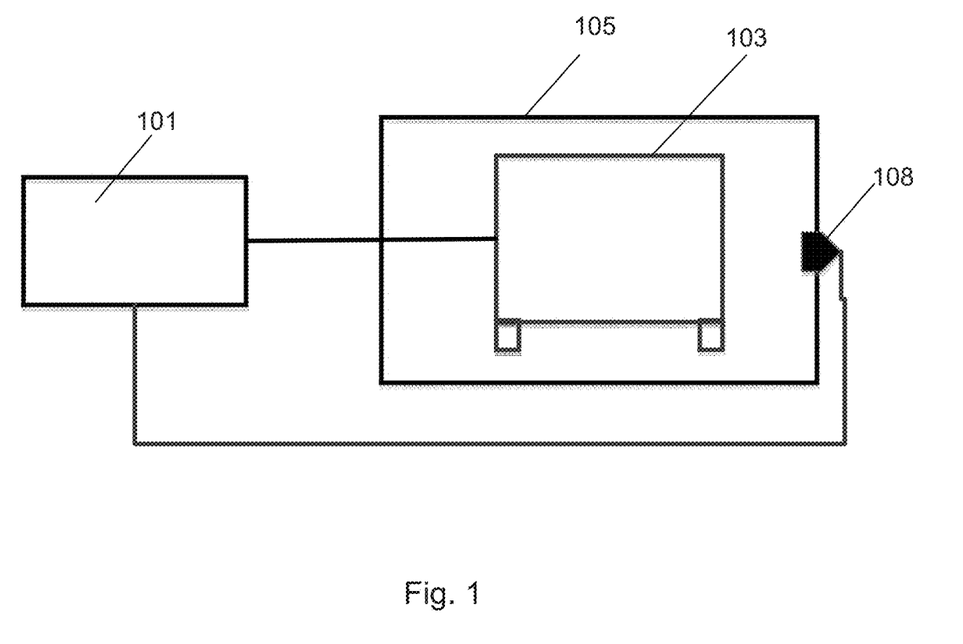
FIG. 1 is a schematic block diagram illustrating an example of a system.

FIG. 1 illustrates an example of a testing device 101 which may execute testing of a communication node 103. For example, the testing device 101 may test whether the communication node 103 is capable of operating during extreme environmental conditions by measuring test parameters and possibly also reference parameters.

The testing device 101 is connected to the communication node 103 via a wire. The testing device 101 may be for example a computer, another communication node 103 etc. The testing is done by measuring parameters such as Radio Frequency (RF) characteristic parameters associated with the communication node 103.

The communication node 103 to be tested may comprise base band equipment, radio equipment and at least one antenna. The communication node 103 which is subject to the testing may be an AAS base station (with a single or multiple enclosure solution). Recall from above that an AAS base station is a base station where at least the antenna and the radio equipment are co-located. In an AAS base station with a single enclosure solution, the baseband equipment and the radio equipment are located in one capsuling. This means that the communication node 103 which is tested is constituted by the baseband equipment, the radio equipment and the antenna. In an AAS base station with a multiple enclosure solution, the communication node 103 which is tested is constituted by the radio equipment and the antenna. In this case, the baseband equipment is separated from the radio equipment (there may be e.g. an optical connection between the baseband and radio equipment), and is not part of the object which is under test. The communication node 103 may also be referred to as a test base station or an Antenna Under Test (AUT), Device Under Test (DUT) etc.

The communication node 103 has a certain node setting during the testing. The same node setting is applied to the communication node 103 during testing in any location and in any condition. Information regarding the node setting is stored in the communication node 103. In addition, the information regarding the node setting may be stored in an external memory, the testing device 101, in a cloud memory, or any other suitable memory which is accessible (using wireless or wired communication) by the communication node 103 and the testing device 101. The node setting may be band configuration, output power etc. of the communication node 103 during the measurement of the parameters.

During the test, the communication node 103 may be located in reference location (not shown) or in a test location 105.

The test location 105 may be adapted to have different conditions, i.e. a first condition and a second condition. The first condition is different from the second condition with regards to e.g. temperature and vibration. The first condition may be referred to as a normal operating condition and the second condition may be referred to as an extreme operating condition. The terms normal test environment and extreme test environment, normal condition and extreme condition may also be used when referring to the first and second conditions.

A normal operating condition may be described as a condition with room temperature and without substantial vibrations. In a normal operating condition, the communication node 103 operates correctly and there is a low risk for component failure. An extreme operating condition may be described as a condition with a high or low temperature (high compared to the room temperature, and low compared to the room temperature) and/or with vibrations. The extreme operating condition may have for example a maximum extreme temperature, a minimum extreme temperature, a maximum vibration etc. in which the communication node 103 is capable of operating. If the communication node 103 is subject to even higher or lower temperatures or vibrations, it is a risk that it will not operate correctly and there is a risk for component failure.

In a normal condition, the test may be performed within certain minimum and maximum limits. Such limits may be defined by the manufacturer of the communication node 103.

For example, Annex B2 of Release 13 of 3GPP TS 37.141 V13.2.0 (2016 March) defines the conditions of a normal test environment as a test being performed within the minimum and maximum limits stated in Table 1 below:

TABLE 1

| Condition | Minimum | Maximum |
| --- | --- | --- |
| Barometric pressure | 86 kPa | 106 kPa |
| Temperature | 15° C. | 30° C. |
| Relative Humidity | 20% | 85% |
| Power supply | Nominal, as declared by the manufacturer | |
| Vibration | Negligible | |

In an extreme test environment, the communication node 103 is subject to at least one extreme parameter such as for example extreme temperature (minimum or maximum temperature for the communication node 103 which is defined by the manufacturer), vibration (the test may be performed while the communication node 103 is subjected to a vibration sequence as defined by the manufacturer) and power supply (upper and lower voltage limit, as defined by the manufacturer).

In some embodiments, there may be two test locations 105, where each test location has a specific condition. For example a first test location may have a first condition and a second test location may have a second condition. In order to test the communication node 103 in different conditions, the communication node 103 needs to be moved from one location to the other. Note that only one test location 105 is illustrated in FIG. 1 for the sake of simplicity.

The test location 105 may be a closed space, typically an indoor location. The test location 105 may be for example a box or a chamber, e.g. a RF anechoic chamber. An anechoic chamber is a chamber or box designed to completely absorb reflections of sound or electromagnetic waves. An anechoic chamber is also insulated from exterior sources of noise. Measurements obtained in the test location 105 may be referred to as test parameters or relative test values.

The reference location may be a far field test range or a CATR, and has a condition which is substantially similar to one of the conditions in the test location 105, e.g. a first condition. Measurements obtained in the reference location may be referred to as reference parameters or absolute reference values.

An absolute value or number is a real or precise number. A relative value is dependent on or compared with another value. For example, a relative value is dependent on or compared with an absolute value.

A reference node 108 may be also used in the testing in order to transmit radio waves to the communication node 103 OTA and to receive radio waves transmitted from the communication node 103 OTA. The reference node 108 could be moved to scan the electrical field over the whole antenna aperture of the communication node 103. The testing device 101 may be connected to the reference node 108 via a wire. The reference node 108 may be located in the reference location or in the test location 105, or in both. The reference node 108 may also be referred to as a probe antenna (when located in the test location 105) and as a test range antenna (when located in the reference location).

Radio frequency characteristics of a communication node 103 such as an AAS base station can be divided into following categories based on figure of merit: 1) Amplitude (or power) level based characteristics, such as output power (Equivalent Isotopically Radiated Power (EIRP), unwanted emission and sensitivity (Equivalent Isotropic Sensitivity (EIS)) and 2) Frequency or timing based characteristics, such absolute carrier frequency and Timing Alignment Error (TAE).

EIRP is a RF characteristic parameter of a communication node 103 which may be described as the specified or measured radiated or transmitted power in a single direction. Another way of describing EIRP is the amount of power a perfectly isotropic antenna would need to radiate to achieve the measured value. EIS is another such RF characteristic parameter which provides the measured sensitivity in a single direction for the communication node 103. TAE is a RF characteristic for a communication node 103 which may be defined as the largest timing difference between any two signals from antennas at the transmitting antenna ports. The absolute carrier frequency should be within certain frequency boundaries. If it is, then it can be said that there is frequency stability.

In one example (explained in more detail with reference to FIG. 2 later), the principle that RF characteristics for a communication node 103 can be verified in environmental conditions can be done by splitting up the requirement and testing in two cases: 1) Absolute measurement of radiated RF characteristics in normal temperature condition and 2) Relative measurement of radiated RF characteristics in extreme temperature condition.

The embodiments herein allow usage of antenna test ranges operating in room temperature condition (e.g. direct far-field, Compact Antenna Test Range (CATR) or near-field scanner based approaches). The absolute measurement values in a normal condition may be used as a reference for the relative measurement conducted in extreme temperature condition. The extreme temperate condition measurement requires a new type of OTA test approach, where the communication node 103 is put in a rather small shielded anechoic chamber, where the temperature can easily be controlled. Also extreme conditions for vibration can be managed in this type of test location 105.

In the test location 105, the field strength in the near-field close to the communication node 103 to be tested is measured for relevant positions over the antenna aperture comprised in the communication node 103. This type of near-field measurement will not give any absolute measurement values, instead it can be used to measure relative deviation to the absolute measured value in room temperature.

The measurement procedure can briefly be described as: a) Measure absolute reference value in normal condition (room temperature) using measurement facility A (reference location); b) Measure near-field coupled value in normal condition (room temperature) using measurement facility B (test location)—this test point associates the measure EIRP/EIS level measured in (a) with the power measured in the near-field using measurement facility B (test location 105); c) Measure near-field coupled value in extreme condition (maximum temperature) using measurement facility B (test location 105); d) Measure near-field coupled value in extreme condition (minimum temperature) using measurement facility B (test location 105); e) Measure near-field coupled value in extreme condition (room temperature and vibration) using measurement facility B (test location 105); and f) Measure near-field coupled value during vibration in normal condition (room temperature) using measurement facility B (test location 105).

This approach of handling OTA testing in extreme condition requires the communication node 103 to be tested to be configured exactly the same when RF characteristics are tested in facility A and B, i.e. in the reference location and the test location.

First the communication node 103 is tested according to OTA requirements (such as radiated transmit power and OTA sensitivity). This test is conducted in test facility A (reference location).

The communication node 103 is thereafter directly moved to a test facility B (test location) 105), which can be described as a shielded anechoic box. As mentioned above, inside the box 105 a reference antenna 108 is situated that can either transmit or receive power OTA. The reference antenna 108 could be moved to scan the electrical field over the whole antenna aperture of the communication node 103. The environment with respect to temperature and vibration can be controlled during the testing.

In a shielded anechoic chamber 105, the temperate can be controlled by either changing the air using an external temperate chamber and circulating fan or placing the test location 105 with the communication node 103 in a large temperate chamber. The approach to achieve temperature balance is selected based on access to specific test equipment.

For an EIRP test, the communication node 103 is then activated in transmitter mode during normal conditions. The power received by the measurement probe 108 in facility B (i.e. the test location 105) is detected during normal conditions and stored. The measurement may be done for two orthogonal polarizations. Measurements are thereafter carried out under extreme conditions, e.g. temperature and vibration, and received power in the reference antenna 108 is detected. The differential between measured values during normal and extreme conditions may be calculated and translated to EIRP under extreme conditions by adding the differential to measured values in the test facility A (e.g. CATR, reference location).

Frequency stability and Time Alignment Error (TAE) under extreme conditions may be measured by only using the test location 105 described as facility B. First under normal conditions and thereafter applying extreme conditions. In other words, it is not necessary to measure the frequency stability and TAE in the reference location and to obtain absolute measurement values. This is described in more detail with reference to FIG. 3 below.

Since environmental conditions testing using this approach requires two different OTA test facilities; one for normal condition and one for extreme condition, the test object (AKA communication node 103) may have functionality to store measurement data associated to normal condition. The stored data is then used as reference when the communication node 103 is subject to the extreme testing. The data may comprise at least one of absolute measurement values and associated configuration parameters. By putting a memory in the communication node 103, it minimizes the risk to use the wrong reference when RF characteristics for extreme condition are calculated. The reference data relevant for normal condition is stored when RF characteristics is done in test facility A (reference location).

Figure 2:
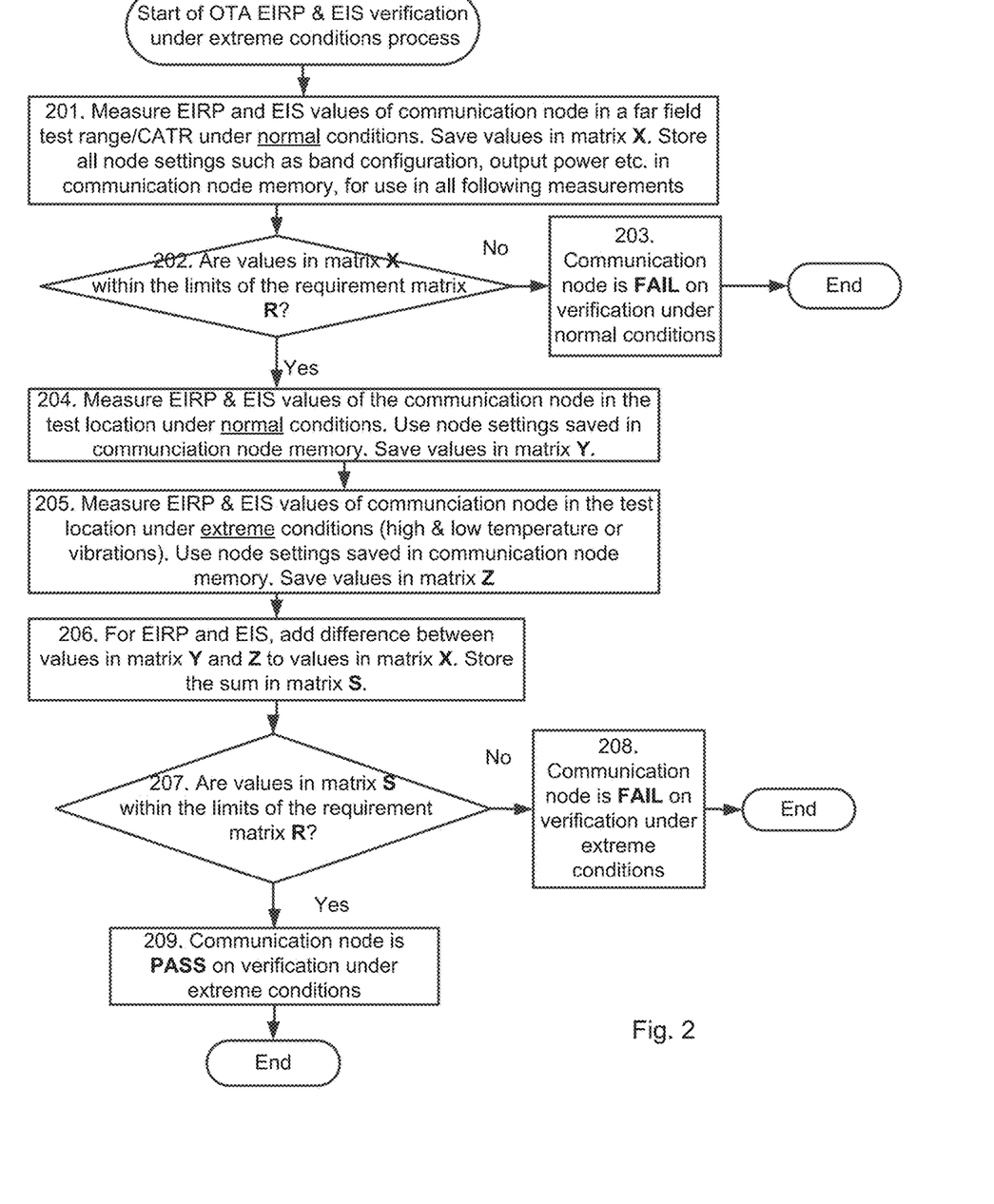
FIG. 2 is a flow chart illustrating an example method using EIRP & EIS.
Figure 3:
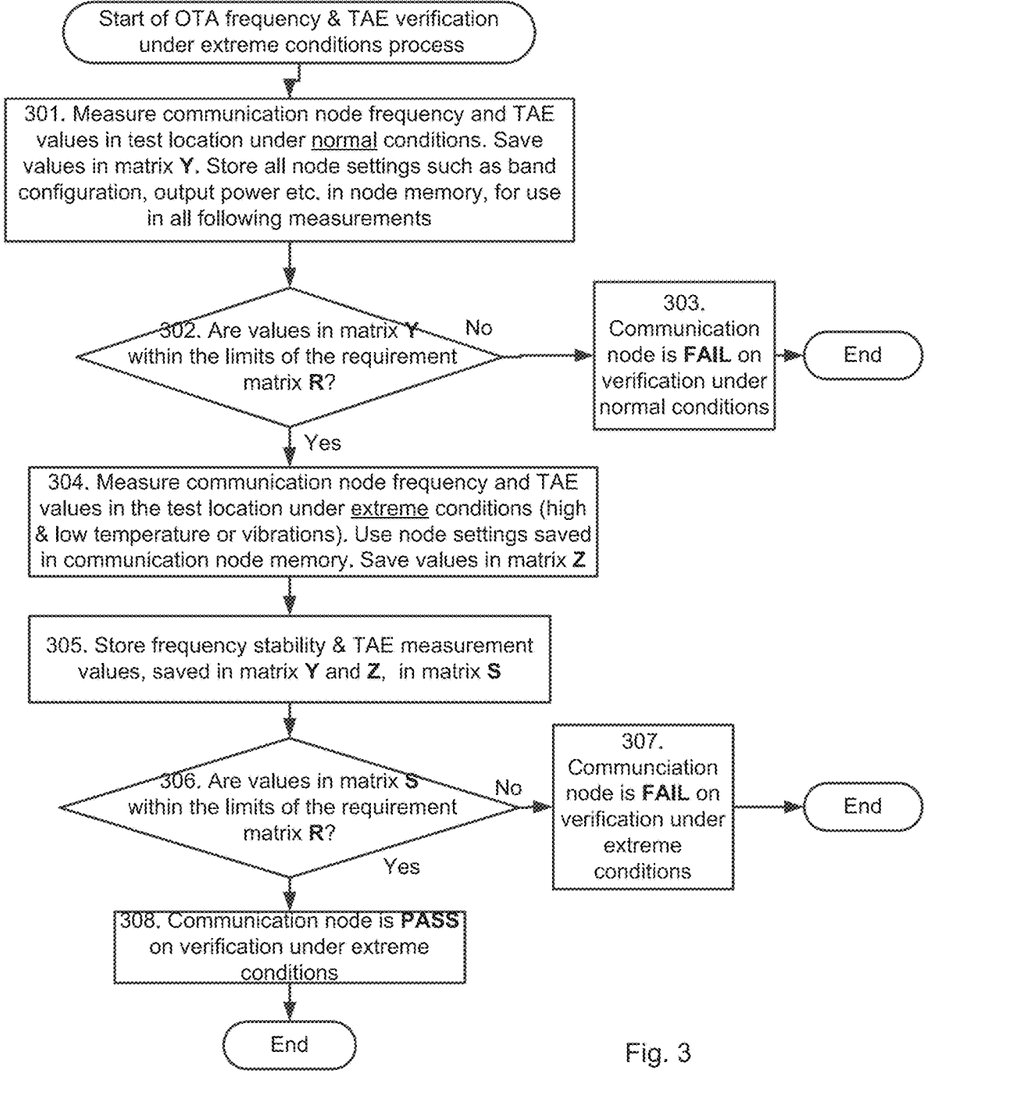
FIG. 3 is a flow chart illustrating an example method using frequency stability and TAE.

Two example methods for enabling testing of a communication node will now be described with reference to FIG. 2 and FIG. 3. FIG. 2 is a flow chart illustrating an example of the method where the parameters to be used in the testing are EIRP and EIS. FIG. 3 is a flow chart illustrating another example of the method where the parameters to be used in the testing are frequency stability and TAE. In other words, the difference between FIGS. 2 and 3 is the RF parameters that are measured during the testing.

Starting with FIG. 2. FIG. 2 illustrates a process for OTA EIRP & EIS verification under extreme conditions. In FIG. 2, the first condition is exemplified with a normal condition and the second condition is exemplified with an extreme condition. The example method illustrated in FIG. 2 comprises at least some of the following steps, which steps may be performed in any suitable order than described below:

Step 201

The communication node 103 to be tested is located at a far field test range or a CATR in step 201. The far field test range or CATR has a normal condition. The testing device 101 measures the EIRP and EIS values associated with the communication node 103 in the far field test range or the CATR under the normal condition. The measured EIRP and EIS values are saved, for example in a matrix X (X= [EIRP$_x$EIS$_x$]). The matrix X may have any dimension n×n, where n is any positive integer.

The testing device 101 enables the node settings such as band configuration, output power etc. to be stored in the communication node 103 (e.g. a memory of the communication node 103), for use in all following measurements.

The measurement performed in step 201 may be seen as a reference measurement obtaining reference parameters which are absolute values to be used in comparison with other measurement values, i.e. relative values, obtained in the steps below. Thus, the far field test range or the CATR where the communication node 103 is located during the measurement in step 201 may be seen as a reference location.

In the far field test range or a CATR, there may be a reference antenna 108. The reference antenna 108 may be referred to as a test range antenna in the far field test range or CATR.

The reference parameters EIRP and EIS measured in the field test range or CATR are OTA measurements obtained using the reference antenna 108.

Step 202

The testing device 101 checks whether the measured EIRP and EIS values fulfils a requirement. Using other words, the testing device 101 checks if the values in matrix X (From step 201) are within the limits of the requirement matrix R. The requirement matrix R may have any dimension m×m, where m is any positive integer. The requirement may be defined by the manufacturer of the communication node 103.

If the values do not fulfil the requirement, the method proceeds to step 203 (indicated with "no" in FIG. 2). If the values fulfil the requirement, the method proceeds to step 204 (indicated with "yes" in FIG. 2).

Requirement information (e.g. the matrix R) may be stored in at least one of the communication node 103, the testing device 101, an external memory, in a cloud memory etc.

The requirement may be for example as described in Release 13 of 3GPP TS 37.105 V13.0.0 (2016 March).

Step 203

This step is performed if the measured EIRP and EIS do not fulfil the requirement checked in step 202. Since the measured EIRP and EIS under the normal requirement did not fulfil the requirement, the testing device 101 determines that the communication node 103 fails the verification of operation during normal condition, i.e. the communication node 103 is not capable of operating during normal conditions.

Step 204

This step is performed if the measured EIRP and EIS fulfil the requirement checked in step 202. The communication node 103 is moved to a test location, and the test location has a normal operating condition. The testing device 101 measures the EIRP & EIS values associated with the communication node 103 in the test location 105 under normal conditions. The EIRP is measured when the communication node 103 transmits radio waves to be received by the reference node 108, and the EIS is measured when the communication node 103 receives radio waves transmitted by the reference node 108. The node settings saved in communication node memory is used, i.e. the communication node 103 has the same settings in both steps 201 and 204. The EIRP and EIS measured in step 204 are saved in matrix Y. Matrix Y may have any dimension p×p, where p is a positive integer.

$Y$=[EIRP$_Y$ EIS$_Y$]

Step 205

This step is performed if the measured EIRP and EIS fulfil the requirement checked in step 202. This step may be performed after step 204, or between step 203 and 204.

The communication node 103 is still located at the test location, and the test location now has an extreme operating condition. The testing device 101 measures the EIRP and EIS values associated with the communication node 103 in the test location under extreme conditions (high & low temperature or vibrations). As above, the EIRP is measured when the communication node 103 transmits radio waves to be received by the reference node 108, and the EIS is measured when the communication node 103 receives radio waves transmitted by the reference node 108. The node settings saved in communication node memory is applied to the communication node 103 during the testing. The measured EIRP and EIS values may be saved in matrix Z. The matrix Z may be of any dimension d×d, where d is a positive integer.

$Z$=[EIRP$_Z$ EIS$_Z$]

Step 206

The testing device 101 may derive the difference between the EIRP and EIS measured in steps 204 and 205. The difference may be added to the values measured in step 201. This may be described as a comparison of the reference measurement in step 201 with the test measurements in steps 204 and 205. So, for the EIRP and EIS measured in steps 204 and 205, the difference between the values in matrix Y and Z are added to the values in matrix X. The sum may be stored in matrix S, and matrix S may be of any dimension q×q, where q is a positive integer:

$$S=X+(Z-Y)$$

The matrix S may be referred to as a result parameter, and the matrix R may be referred to as a requirement parameter or a requirement.

Step 207

The testing device 101 checks whether the values in matrix S fulfils the requirement (the same requirement as in step 202), i.e. if the matrix S is within the limits of the requirement matrix R. The requirement matrix R may be defined by the manufacturer of the communication node 103.

If the values do not fulfil the requirement, the method proceeds to step 208 (indicated with "no" in FIG. 2). If the values fulfil the requirement, the method proceeds to step 209 (indicated with "yes" in FIG. 2).

Step 208

This step is performed if the matrix S does not fulfil the requirement checked in step 207. Since the matrix S did not fulfil the requirement, the testing device 101 determines that the communication node 103 fails the verification of operation during an extreme condition, i.e. the communication node 103 is not capable of operating during extreme conditions.

Step 209

This step is performed if the measured EIRP and EIS fulfil the requirement checked in step 207. Since the matrix S fulfils the requirement, the testing device 101 determines that the communication node 103 passes the verification of operation during an extreme condition, i.e. the communication node 103 is capable of operating during extreme conditions.

Information indicating the parameters measured in FIG. 2, requirement (e.g. requirement matrix R), the calculated difference, the result parameter (e.g. matrix S), the matrixes X, Y and Z may be stored in any suitable memory, e.g. a memory comprised in at least one of the communication node 103, testing device 101, external memory, cloud memory etc.

Now turning to FIG. 3. FIG. 3 illustrates a process for OTA frequency & TAE verification under extreme conditions. In FIG. 3, the first condition is exemplified with a normal condition and the second condition is exemplified with an extreme condition. As mentioned above, one difference between FIGS. 2 and 3 is the parameters which are measured. Other differences are that in FIG. 3, there is no measurement performed at a reference location, i.e. at a far field test range/CATR, and that the testing device 101 does not calculate any difference between the measurements. The communication node 103 is only tested at the test location in FIG. 3. The example method illustrated in FIG. 3 comprises at least some of the following steps, which steps may be performed in any suitable order than described below:

Step 301

This step corresponds to step 204 in FIG. 2, but different RF parameters are measured. The testing device 101 measures the communication node's frequency stability (f) and TAE values of the communication node 103 in the test location under normal conditions. The frequency and TAE values measured in step 301 may be saved in matrix Y. Matrix Y may have any dimension p×p, where p is a positive integer.

$$Y=[f_Y \text{TAE}_Y]$$

The communication node settings such as band configuration, output power etc. may be stored in the communication node memory, for use in all following measurements.

Step 302

The testing device 101 checks whether the measured frequency stability and TAE values fulfils a requirement. Using other words, the testing device 101 checks if the values in matrix Y (From step 301) are within the limits of the requirement matrix R. The requirement matrix R may have any dimension m×m, where m is any positive integer. The requirement may be defined by the manufacturer of the communication node 103.

If the values do not fulfil the requirement, the method proceeds to step 303 (indicated with "no" in FIG. 3). If the values fulfil the requirement, the method proceeds to step 304 (indicated with "yes" in FIG. 3).

The requirement may be for example as described in Release 13 of 3GPP TS 37.105 V13.0.0 (2016 March).

Step 303

This step is performed if the measured frequency and TAE values do not fulfil the requirement checked in step 302. Since the measured frequency and TAE values under the normal requirement did not fulfil the requirement, the testing device 101 determines that the communication node 103 fails the verification of operation during normal condition, i.e. the communication node 103 is not capable of operating during normal conditions.

Step 304

This step corresponds to step 205 in FIG. 2, but different RF parameters are measured. This step is performed if the measured frequency and TAE values fulfil the requirement checked in step 302. The communication node 103 is still located at the test location, and the test location now has an extreme operating condition. The testing device 101 measures the frequency and TAE values of the communication node 103 in the test location under extreme conditions (high & low temperature or vibrations). The node settings saved in communication node memory is applied to the communication node 103 during the testing. The measured frequency and TAE values may be saved in matrix Z. The matrix Z may be of any dimension d×d, where d is a positive integer.

$$Z=[f_Z \text{TAE}_Z]$$

Frequency stability is measured in absolute figures, both in normal and extreme conditions.

Step 305

The testing device 101 may store frequency stability & TAE measurement values, saved in matrix Y and Z, in matrix S:

$$S=[Y\ Z].$$

Step 306

This step corresponds to step 207 in FIG. 2. The testing device 101 checks whether the values in matrix S fulfils the requirement (the same requirement as in step 302), i.e. if the matrix S is within the limits of the requirement matrix R. The requirement matrix R may be defined by the manufacturer of the communication node 103.

If the values do not fulfil the requirement, the method proceeds to step 307 (indicated with "no" in FIG. 3). If the values fulfil the requirement, the method proceeds to step 308 (indicated with "yes" in FIG. 3).

As mentioned earlier, there is no need to calculate any difference in FIG. 3 (as in FIG. 2). The Y and Z values (stored in S) can be compared directly towards the requirement in matrix S.

Note that the matrixes X, Y, Z, R and S may be of the same or different dimension.

Step 307

This step corresponds to step 208 in FIG. 2. This step is performed if the matrix S does not fulfil the requirement checked in step 306. Since the matrix S did not fulfil the requirement, the testing device 101 determines that the communication node 103 fails the verification of operation during an extreme condition, i.e. the communication node 103 is not capable of operating during extreme conditions.

Step 308

This step corresponds to step 209 in FIG. 2. This step is performed if the measured frequency and TAE fulfil the requirement checked in step 306. Since the matrix S fulfils the requirement, the testing device 101 determines that the communication node 103 passes the verification of operation during an extreme condition, i.e. the communication node 103 is capable of operating during extreme conditions.

Information indicating the parameters measured in FIG. 3, requirement (e.g. requirement matrix R), the result parameter (e.g. matrix S), the matrixes X, Y and Z may be stored in any suitable memory, e.g. a memory comprised in at least one of the communication node 103, testing device 101, external memory, cloud memory etc.

Figure 4:
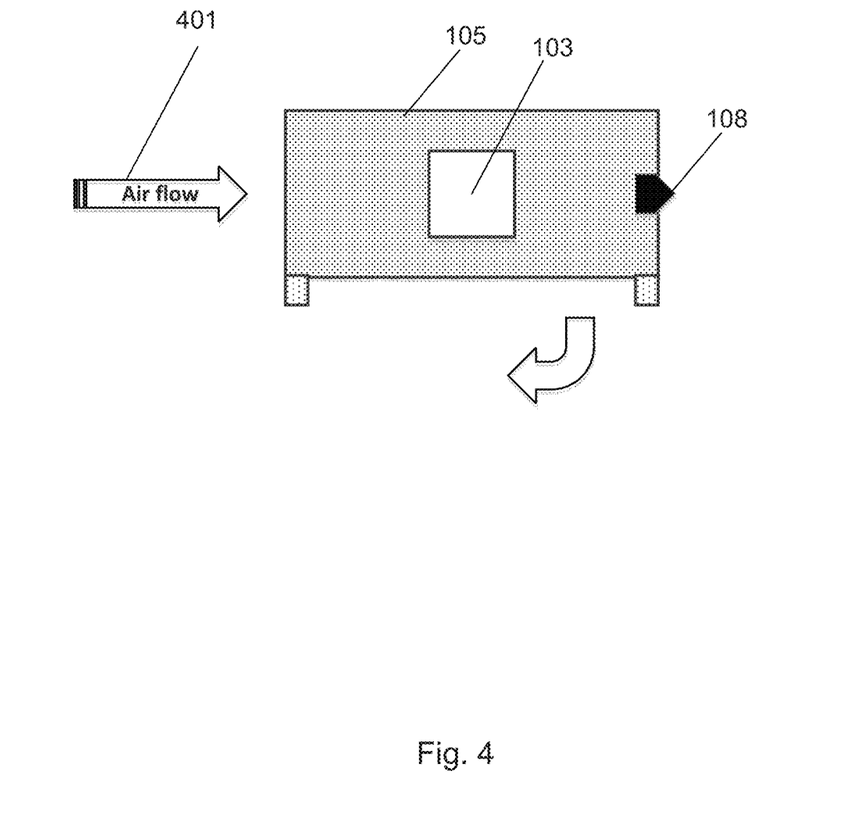
FIG. 4 is a schematic block diagram illustrating an example of a test environment.

FIG. 4 is a schematic block diagram illustrating an example of the testing environment. In FIG. 4, the test location 105 is exemplified with an anechoic chamber. The communication node 103 is placed inside the anechoic chamber 105. An air flow 401 is forced to pass through the anechoic chamber 105 in order to control the temperature. The bended arrow below the test location 105 indicates that the air flow 401 leaves the test location 105 after having passed the communication node 103. As mentioned above, the temperate can be controlled by either changing the air using an external temperate chamber and circulating fan or placing the test location 105 with communication node 103 in a large temperate chamber. The approach to achieve temperature balance may be selected based on access to specific test equipment.

Figure 5:
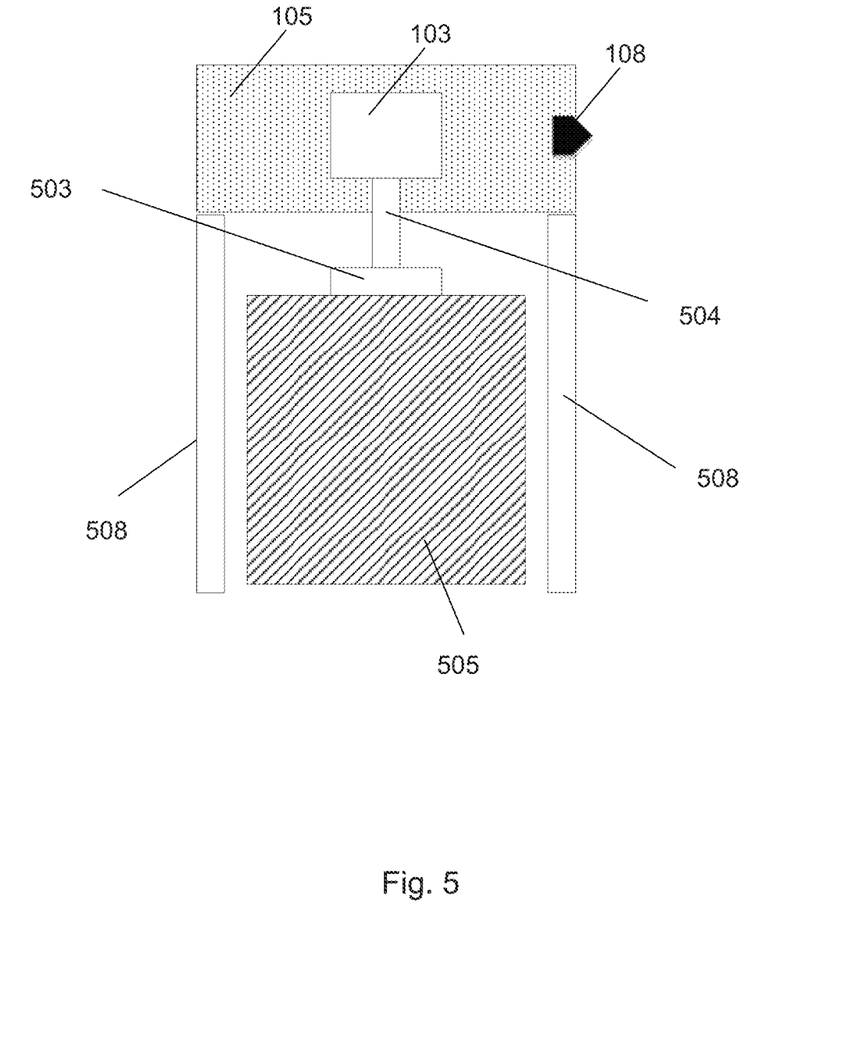
FIG. 5 is a schematic block diagram illustrating an example of a test environment.

As mentioned earlier, the different conditions in which the communication node 103 is tested have different temperature, vibration, power supply etc. In order to provide vibration of the communication node 103 in the second condition (e.g. extreme condition), a vibrator may be used. FIG. 5 is a schematic block diagram illustrating an example where the communication node 103 is placed inside the test location 105, e.g. an anechoic chamber. The test location 105 is placed above a vibrator and isolated from the moving parts. The communication node 103 is connected to the vertical moving inner cylinder 503 via a mechanical fixture 504. FIG. 5 illustrates an example with a vertical vibrator, but a horizontal vibrator can also be used. In FIG. 5, the test location 105 is exemplified as a box with support legs 508. When vibration is applied to the communication node 103, the cylinder 503, the communication node 103 and the mechanical fixture 504 are the parts which are moving, i.e. vibrating. The cylinder 503 and a base unit 505 may be seen as one unit, i.e. the vibrator. The base unit 505 may be a unit which is fixedly mounted and the cylinder 503 is the moving part. The mechanical fixture 504 is a unit for connecting the cylinder 503 and the communication node 103.

Figure 6A:
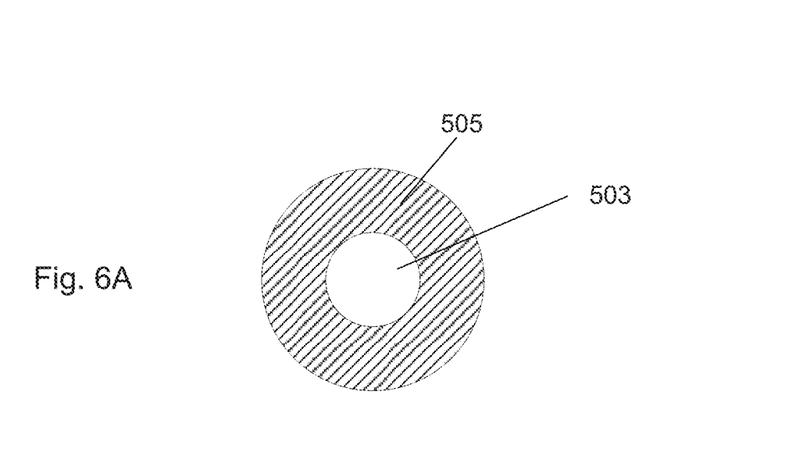
FIG. 6A is a schematic block diagram illustrating a top view of a vibrator.
Figure 6B:
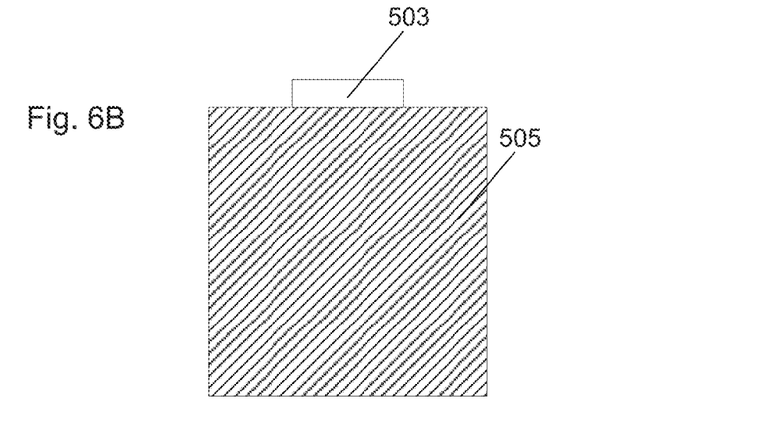
FIG. 6B is a schematic block diagram illustrating a side view of a vibrator.

FIG. 6A is a schematic block diagram illustrating a top view of vibrator with the outer fixed cylinder 505 and the inner vertically vibrating cylinder 503. FIG. 6B is a schematic block diagram illustrating a side view of the vibrator with the outer fixed cylinder 505 and inner vertically vibrating cylinder 503.

The method described above will now be described using FIG. 7. The method performed by the testing device 101 comprises at least some of the following steps, which steps may be performed in any suitable order than described below:

Step 700

Figure 7:
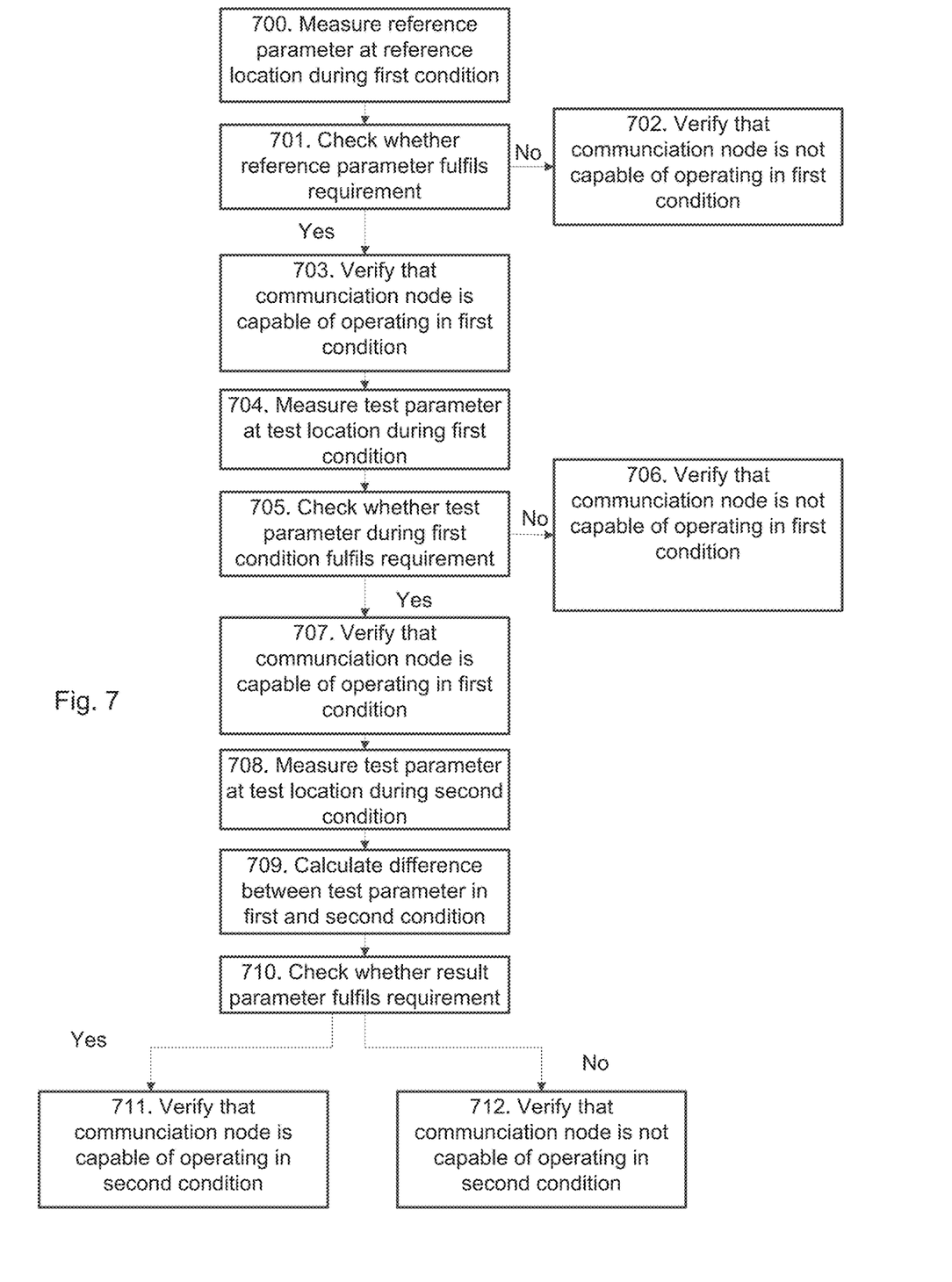
FIG. 7 is a flow chart illustrating an example of a method.

This step corresponds to step 201 in FIG. 2. The testing device 101 may measure a reference parameter associated with the RF characteristics of the communication node 103 when the communication node 103 is at a reference location during the first condition. The communication node 103 is configured with the same node setting during measurement of the reference parameter as during the first and second conditions.

The communication node 103 may be located in a far field test range or CATR when being located at the reference location.

The first condition may be a normal operating condition of the communication node 103.

The communication node 103 may be an AAS base station.

Step 701

This step corresponds to step 202 in FIG. 2. The testing device 101 may check whether the reference parameter measured at the reference location during the first condition fulfills a requirement. The test parameter is measured at the test location 105 during the first condition when the test parameter fulfills the requirement.

Step 702

This step corresponds to step 203 in FIG. 2. When the reference parameter does not fulfil the requirement (indicated with "no" in FIG. 7), the testing device 101 verifies that the communication node 103 is not capable of operating during the first condition.

Step 703

This step corresponds to step 204 in FIG. 2. When the reference parameter fulfils the requirement (indicated with "yes" in FIG. 7), the testing device 101 verifies that the communication node 103 is capable of operating during the first condition.

Step 704

This step corresponds to step 204 in FIG. 2, step 301 in FIG. 3. The testing device 101 measures a test parameter associated with RF characteristics of the communication node 103 when it is located at a test location 105 during the first condition. The communication node 103 is configured with a node setting during the measurement in the first condition.

The test parameter may be at least one of: Equivalent Isotropic Radiated Power (EIRP), Equivalent Isotropic Sensitivity (EIS), Timing Alignment Error (TAE) and frequency stability.

The test location 105 may be a radio frequency anechoic chamber.

Step 705

This step corresponds to step 302 in FIG. 3. The testing device 101 checks whether the test parameter measured during the first condition fulfills a requirement.

Step 706

This step corresponds to step 303 in FIG. 3. When the test parameter during the first condition does not fulfil the requirement (indicated with "no" in FIG. 7), the testing device 101 may verify that the communication node 103 is not capable of operating during the first condition.

Step 707

This step corresponds to step 304 in FIG. 3. When the test parameter during the first condition fulfils the requirement (indicated with "yes" in FIG. 7), the testing device 101 may verify that communication node 103 is capable of operating in the first condition.

Step 708

This step corresponds to step 205 in FIG. 2 and step 304 in FIG. 3. The testing device 101 measures the test parameter associated with the RF characteristics of the communication node 103 when it is located at the test location 105 during a second condition. The communication node 103 is configured with the same node setting in the second condition as in the first condition.

The second condition may be an extreme operating condition of the communication node 103.

Step 709

This step corresponds to step 206 in FIG. 2. The testing device 101 may calculate a difference between the test parameter measured in the first and second conditions. The result parameter is a sum of the reference parameter and the calculated difference.

The result parameter may comprise the test parameter measured during the first and second conditions.

Step 710

This step corresponds to step 207 in FIG. 2 and step 306 in FIG. 3. The testing device 101 checks whether the result parameter associated with the test parameter measured during the first and second condition fulfils the requirement.

Step 711

This step corresponds to step 209 in FIG. 2 and step 308 in FIG. 3. When the result parameter fulfils the requirement, the testing device 101 may verify that the communication node 103 is capable of operating during the second condition.

Step 712

This step corresponds to step 208 in FIG. 2 and step 308 in FIG. 3. When the result parameter does not fulfil the requirement, the testing device 101 may verify that the communication node 103 is not capable of operating during the second condition.

The node setting, the test parameter measured during the first and second conditions may be stored in at least one of: the communication node 103, the testing device 101 and an external memory.

The reference parameter and the test parameters in the first and second conditions may be OTA measurements using a reference antenna 108.

Figure 8:
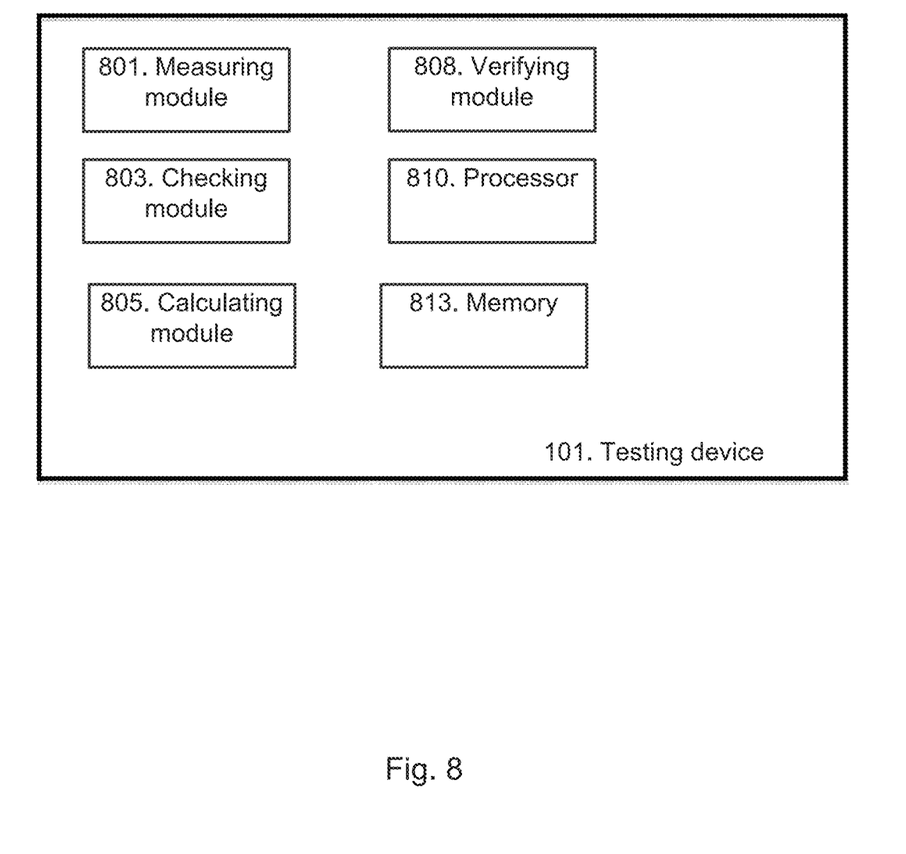
FIG. 8 is a schematic block diagram illustrating embodiments of a testing device.

To perform the method steps shown in FIG. 7 for enabling testing of a communication node 103, the testing device 101 may comprise an arrangement as shown in FIG. 8. To perform the method steps shown in FIG. 7 for enabling testing of a communication node 103, the testing device 101 is configured to, e.g. by means of a measuring module 801, measure a test parameter associated with RF characteristics of the communication node 103 when it is located at a test location 105 during a first condition. The communication node 103 is configured with a node setting during the measurement in the first condition. The test parameter may be at least one of: EIRP, EIS, TAE and frequency stability.

The testing device 101 is further configured to, e.g. by means of the measuring module 801, measure the test parameter associated with the RF characteristics of the communication node 103 when it is located at the test location 105 during a second condition. The communication node 103 is configured with the same node setting in the second condition as in the first condition.

The testing device 101 is configured to, e.g. by means of a checking module 803, check whether a result parameter associated with the test parameter measured during the first and second condition fulfills the requirement.

The testing device 101 may be configured to, e.g. by means of the measuring module 801, measure a reference parameter associated with the RF characteristics of the communication node 103 when the communication node 103 when it is at a reference location during the first condition. The communication node 103 may be configured with the same node setting during measurement of the reference parameter as during the first and second conditions. The communication node 103 may be located in a far field test range or Compact Antenna Test Range (CATR), when being located at the reference location. The reference parameter may be at least one of: EIRP and EIS.

The testing device 101 may be configured to, e.g. by means of the checking module 803, check whether the reference parameter measured at the reference location during the first condition fulfils a requirement.

The testing device 101 may be configured to, e.g. by means of a calculating module 805, calculate a difference between the test parameter measured in the first and second conditions. The result parameter may be a sum of the reference parameter and the calculated difference. The result parameter may comprise the test parameter measured during the first and second conditions.

The testing device 101 may be configured to, e.g. by means of a verifying module 808, when the result parameter fulfils the requirement, verify that the communication node 103 is capable of operating during the second condition.

The testing device 101 may be configured to, e.g. by means of the verifying module 808, when the result parameter does not fulfil the requirement, verify that the communication node 103 is not capable of operating during the second condition.

The testing device 101 may be configured to, e.g. by means of the checking module 803, check whether the test parameter measured during the first condition fulfills a requirement.

The testing device 101 may be configured to, e.g. by means of the verifying module 808, when the test parameter during the first condition does not fulfil the requirement, verify that the communication node 103 is not capable of operating during the first condition.

The node setting, the test parameter measured during the first and second conditions may be stored in at least one of: the communication node 103, the testing device 101 and an external memory.

The first condition may be a normal operating condition of the communication node 103 and the second condition may be an extreme operating condition of the communication node 103. The first condition may be a normal environmental condition at the reference location and the test location 105 and the second condition may be an extreme environmental condition at the test location 105.

The communication node 103 may be an AAS base station.

The reference parameter and the test parameters in the first and second conditions may be OTA measurements using a reference antenna 108.

The test location 105 may be a radio frequency anechoic chamber.

The testing device 101 may comprises a processor 810 and a memory 813. The memory 813 comprises instructions executable by the processor 810.

The memory 813 may comprise one or more memory units. The memory 813 may be arranged to be used to store data, received data streams, power level measurements, threshold values, time periods, configurations, schedulings, test parameters, reference parameters, result parameter, matrices, requirement information, node settings, first condition information, second condition information and applications to perform the methods herein when being executed in the testing device 101.

The present mechanism for enabling testing of a communication node 103 may be implemented through one or more processors, such as the processor 810 in the testing device 101 depicted in FIG. 8, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the testing device 101. One such carrier may be in the form of a CD ROM disc. It is however feasible with other data carriers such as a memory stick. The computer program code can furthermore be provided as pure program code on a server and downloaded to the testing device 101.

A computer program may comprise instructions which, when executed on at least one processor, cause the at least one processor to carry out at least some of the method steps in FIGS. 2, 3 and 7. A carrier may comprise the computer program, and the carrier is one of an electronic signal, optical signal, radio signal or computer readable storage medium.

Summarized, the embodiments herein use the difference in result of measurements in normal and extreme conditions of EIRP, EIS, frequency stability and TAE. For EIRP and EIS, normal and extreme measurement values can be calibrated towards absolute values by relating measurement results toward measurements carried out in a far field test range/CATR (i.e. a reference location). To ensure that measurements in extreme conditions are fully compatible with reference measurements in far field test range/CATR, node settings and the measurement values from the reference measurement are stored in a memory in the communication node 103 and shall be used to assure that exactly the same settings are used when doing the measurements in extreme conditions.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method performed by a testing device for enabling testing of a communication node, the method comprising:
    measuring a test parameter associated with radio frequency (RF) characteristics of the communication node when the communication node is located at a test location during a first condition, thereby producing a first measurement value for the test parameter;
    measuring the test parameter associated with the RF characteristics of the communication node when the communication node is located at the test location during a second condition, thereby producing a second measurement value for the test parameter;
    obtaining a result value using the first and second measurement values, wherein the result value is a function of at least the first and second measurement values; and
    determining whether the result value fulfills a requirement.

2. The method according to claim 1, further comprising:
    measuring the test parameter associated with the RF characteristics of the communication node when the communication node is at a reference location during the first condition, thereby producing a third measurement value for test parameter, wherein
    obtaining the result value comprises obtaining the result value using the first measurement value, the second measurement value, and the third measurement value, wherein the result value is a function of at the first, second, and third measurement values.

3. The method according to claim 2, further comprising: determining whether the third measurement value fulfills the requirement.

4. The method according to claim 2, wherein obtaining the result value comprises:
    calculating a difference between the first and second measurement values, and
    summing the calculated difference and the third measurement value.

5. The method according to claim 1, wherein the result value is a vector that comprises the first and second measurement values.

6. The method according to claim 1, further comprising: when the result parameter does not fulfil the requirement, verifying that the communication node is not capable of operating during the second condition.

7. The method according to claim 1, further comprising determining whether the test parameter measured during the first condition fulfills a requirement; and
    as a result of determining that the test parameter measured during the first condition does not fulfil the requirement, verifying that the communication node is not capable of operating during the first condition.

8. The method according to claim 1, wherein the test parameter is at least one of: Equivalent Isotropic Radiated Power, Equivalent Isotropic Sensitivity, Timing Alignment Error, and frequency stability.

9. The method according to claim 1, wherein the communication node is an Active Antenna System base station.

10. The method according to claim 1, wherein the test parameters in the first and second conditions are over-the-air measurements using a reference antenna.

11. The method according to claim 1, wherein the test location is a radio frequency anechoic chamber.

12. A computer program product comprising a non-transitory computer readable medium storing a computer program comprising instructions which, when executed on at least one processor, cause the at least one processor to carry out the method according to claim 1.

13. A method performed by a testing device for enabling testing of a communication node, the method comprising:
measuring a test parameter associated with radio frequency (RF) characteristics of the communication node when the communication node is located at a test location during a first condition;
measuring the test parameter associated with the RF characteristics of the communication node when the communication node is located at the test location during a second condition;
determining whether a result parameter associated with the test parameter measured during the first and second conditions fulfills a requirement; and
when the result parameter fulfils the requirement, verifying that the communication node is capable of operating during the second condition.

14. A testing device for enabling testing of a communication node, wherein the testing device is configured to:
measure a test parameter associated with radio frequency (RF) characteristics of the communication node when it is located at a test location during a first condition, thereby producing a first measurement value for the test parameter;
measure the test parameter associated with the RF characteristics of the communication node when it is located at the test location during a second condition, thereby producing a second measurement value for the test parameter;
obtain a result value using the first and second measurement values, wherein the result value is a function of at least the first and second measurement values; and
determine whether the result value fulfills the requirement.

15. The testing device according to claim 14, being further configured to:
measure the test parameter associated with the RF characteristics of the communication node when the communication node when it is at a reference location during the first condition, thereby producing a second measurement value for the test parameter, wherein the testing device is configured to obtain the result value by using the first measurement value, the second measurement value, and the third measurement value, wherein the result value is a function of at the first, second, and third measurement values.

16. The testing device according to claim 15, wherein the communication node is located in a far field test range or Compact Antenna Test Range when being located at the reference location.

17. The testing device according to claim 15, being further configured to:
calculate a difference between the first and second measurement values, and
sum the calculated difference and the third measurement value.

18. The testing device according to claim 14, wherein the result value is a vector that comprises the first and second measurement values.

19. The testing device according to claim 14, being further configured to:
verify that the communication node is capable of operating during the second condition as a result of determining that the result parameter fulfils the requirement.

20. The testing device according to claim 14, being further configured to:
when the result parameter does not fulfil the requirement, verify that the communication node is not capable of operating during the second condition.

21. The testing device according to claim 14, being further configured to:
determine whether the test parameter measured during the first condition fulfills a requirement; and
verify that the communication node is not capable of operating during the first condition as a result of determining that the test parameter during the first condition does not fulfil the requirement.

22. The testing device according to claim 14, wherein the test parameter is at least one of: Equivalent Isotropic Radiated Power, Equivalent Isotropic Sensitivity, Timing Alignment Error, and frequency stability.

23. The testing device according to claim 14, wherein the communication node is an Active Antenna System base station.

24. The testing device according to claim 14, wherein the test location is a radio frequency anechoic chamber.

* * * * *

UNITED STATES PATENT AND TRADEMARK OFFICE
CERTIFICATE OF CORRECTION

PATENT NO. : 10,659,174 B2
APPLICATION NO. : 16/514584
DATED : May 19, 2020
INVENTOR(S) : Elfstrom et al.

Page 1 of 2

It is certified that error appears in the above-identified patent and that said Letters Patent is hereby corrected as shown below:

In the Specification

In Column 1, Line 9, delete "2017 (status pending)," and insert -- 2017, now Pat. No. 10,389,455, --, therefor.

In Column 8, Line 32, delete "(test location) 105)," and insert -- (test location 105), --, therefor.

In Column 9, Lines 40-41, delete "X (X=[EIRP$_x$EIS$_x$1]." and insert -- X (X=[EIRP$_x$ EIS$_x$]). --, therefor.

In Column 12, Line 5, delete "Y=[f$_Y$TAE$_Y$]" and insert -- Y=[f$_Y$ TAE$_Y$] --, therefor.

In Column 13, Line 67, delete "cylinder 505" and insert -- cylinder 503 --, therefor.

In Column 14, Line 3, delete "cylinder 505" and insert -- cylinder 503 --, therefor.

In Column 16, Lines 10-11, delete "communication node 103 when the communication node 103 when it is at a reference location" and insert -- communication node 103 when it is at a reference location --, therefor.

In Column 17, Line 26, delete "CD ROM" and insert -- CD-ROM --, therefor.

In the Claims

In Column 18, Line 32, in Claim 2, delete "at the" and insert -- at least the --, therefor.

In Column 18, Line 50, in Claim 7, delete "comprising" and insert -- comprising: --, therefor.

Signed and Sealed this
Fifteenth Day of September, 2020

Andrei Iancu
*Director of the United States Patent and Trademark Office*

CERTIFICATE OF CORRECTION (continued)
U.S. Pat. No. 10,659,174 B2

In Column 19, Lines 43-44, in Claim 12, delete "communication node when the communication node when it is at a reference location" and insert -- communication node when the communication node is at a reference location --, therefor.

In Column 20, Line 4, in Claim 15, delete "at the" and insert -- at least the --, therefor.